United States Patent [19]

Reed

[11] Patent Number: 4,862,498
[45] Date of Patent: Aug. 29, 1989

[54] METHOD AND APPARATUS FOR AUTOMATICALLY SELECTING SYSTEM COMMANDS FOR DISPLAY

[75] Inventor: Adam V. Reed, Manalapan, N.J.

[73] Assignee: AT&T Information Systems, Inc., New York, N.Y.

[21] Appl. No.: 935,799

[22] Filed: Nov. 28, 1986

[51] Int. Cl.⁴ .................................... H04M 1/27
[52] U.S. Cl. .................... 379/355; 379/354; 379/130; 364/900
[58] Field of Search ... 364/200 MS File, 900 MS File, 364/300; 379/96, 34, 112, 113, 131, 216, 354, 355

[56] References Cited

U.S. PATENT DOCUMENTS

| | | | |
|---|---|---|---|
| 4,160,879 | 7/1979 | Sullivan et al. | 379/354 |
| 4,425,627 | 1/1984 | Eibner | 379/96 |
| 4,431,870 | 2/1984 | May et al. | 379/355 |
| 4,443,664 | 4/1984 | Grange | 379/355 |
| 4,475,013 | 10/1984 | Lee et al. | 379/355 |
| 4,531,186 | 7/1985 | Knapman | 364/300 |
| 4,660,166 | 4/1987 | Hopfield | 364/300 |
| 4,680,729 | 7/1987 | Steinhart | 364/900 |
| 4,689,737 | 8/1987 | Grant | 364/200 |

OTHER PUBLICATIONS

"Touchphone: A New Generation in Telephone Design", Telesis, Two; Bloeden, R. et al.; 1985, pp. 20–25.
"An Interactive Touch Phone for Office Automation", IEEE Communications Magazine, vol. 23, No. 2; Hsing, R. et al., 1985, pp. 21–26.

Primary Examiner—Gareth D. Shaw
Assistant Examiner—Joseph T. Fitzgerald

[57] ABSTRACT

In a user-interactive display-based telephone system, the present invention permits an automatic display of a repertoire of telephone command items most likely to be utilized by a user, thus providing one-touch access to such item without requiring either explicit programming of a command repertoire or a search by the user through the history of previous commands. This is accomplished through the use of three heuristics which consider frequency of command use, recency of command use, and previously failed commands. These heuristics may be implemented either separately or together in the system.

9 Claims, 4 Drawing Sheets

FIG. 3

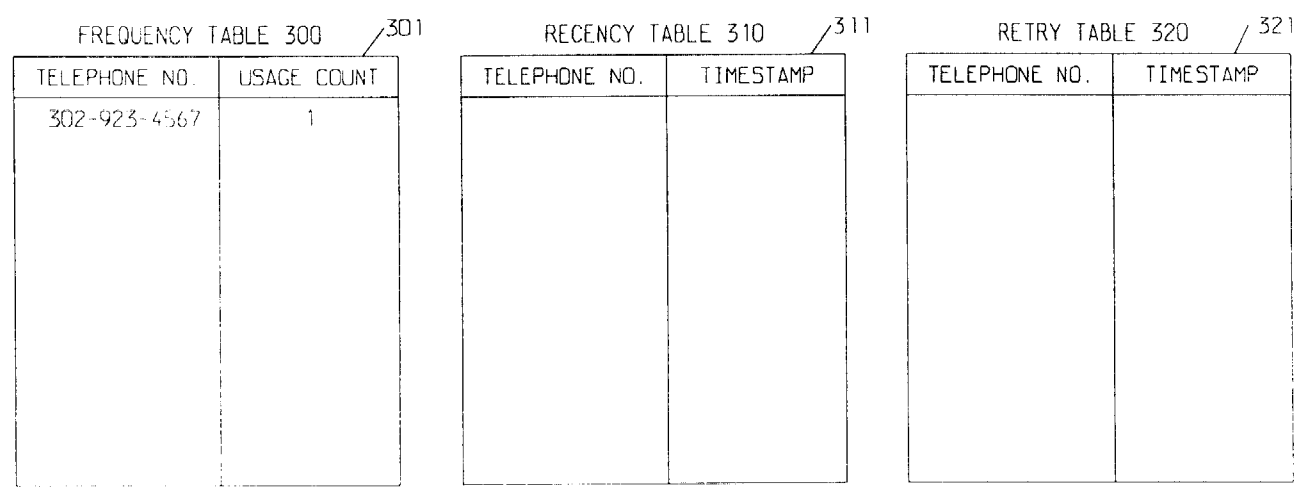

| FREQUENCY TABLE 300 | 301 |
|---|---|
| TELEPHONE NO. | USAGE COUNT |
| 302-925-4567 | 1 |

| RECENCY TABLE 310 | 311 |
|---|---|
| TELEPHONE NO. | TIMESTAMP |
| | |

| RETRY TABLE 320 | 321 |
|---|---|
| TELEPHONE NO. | TIMESTAMP |
| | |

FIG. 4

Tue Dec 10, 1985, 6:03 pm

| SAVED 440 | > | FREQUENT 410 | > |
|---|---|---|---|
| 215-462-1472 | | 201-957-1234 | |
| 201-940-1321 HOME | | 201-957-3284 MR. SMITH | |
| 201-321-4000 POLICE | | 201-740-1941 MR. REED) 403 | |
| 201-445-3200 BANK | | 609-456-0245 MR. JONES | |
| 201-458-3121 TAXI | | 201-861-7801 SUB SHOP | |
| | | 201-215-3215 | |

401

| RECENT 420 | > | RETRY 430 | > |
|---|---|---|---|
| 212-463-2904 | | 212-364-5261 | |
| 201-548-3128 MS. FOX | | 201-591-5292 MS. BEIGER | |
| 201-741-4290 | | 201-940-1321 HOME | |
| 516-920-4848 HARRIS | | | |
| 516-242-4844 XYZ, INC. | | | |
| 201-702-2204 | | | |

402

451  450

| | | |
|---|---|---|
| 1 | ABC 2 | DEF 3 |
| GHI 4 | JKL 5 | MNO 6 |
| PRS 7 | TUV 8 | WXY 9 |
| * | OPR 0 | # |

METHOD AND APPARATUS FOR AUTOMATICALLY SELECTING SYSTEM COMMANDS FOR DISPLAY

TECHNICAL FIELD

This invention is directed to interactive display arrangements and more particularly to an apparatus and a method for enabling the user to select telephone system commands therewith.

BACKGROUND OF THE INVENTION

User interactive display-based systems are becoming popular for enabling a user to select commands for controlling the operation of a system. In these display-based systems, the number of command items (such as telephone numbers, names, or computer commands) available on a display for selection by the user is limited, at any given time, by the finite size of the display. Since the number of command items available for execution is generally much larger than the number that can be simultaneously accommodated by the display, it is desirable that the items actually displayed be those most likely to be selected, at the given time, by the user. Present systems do not offer such a capability.

Two methods exist today for the selection of items for display. One method, used today in most repertory dialers, is to have the user explicitly select, or program, the normally displayed command items. Another method, used in some computer systems, is to store and optionally display a history of past commands, and allow the user to explicitly search this history for command items to be re-executed. Each of the above methods requires that the user perform some task, either programming the repertory or searching through a command history, in addition to the actual activation of the command item. User surveys indicate that many users would prefer not to have to perform such programming or searching tasks.

SUMMARY OF THE INVENTION

The prior art problems are solved in the context of a telephone dialing apparatus in accordance with the present invention by providing the user with one-touch access to telephone calling information (e.g., telephone numbers)—hereinafter referred to as command items—most likely to be needed, without requiring either explicit user programming of a command repertoire or user searching through the history of previous commands.

In one embodiment, command items are displayed automatically by the system according to the likelihood of each command's selection by a user based upon the past usage pattern of the command items. According to the invention, the displayed command items are selected using a "frequency" heuristic which determines which command items are most likely to be executed by a user based on the command items most frequently executed in the past. According to other features of the invention, other heuristics are utilized to select display command items including "recently executed" command items, "attempted" but unsuccessful command items, and "context" related command items. Other embodiments of the present invention utilize various combinations of these heuristics to select command items for display.

BRIEF DESCRIPTION OF THE DRAWING

The characteristics and operation of the present invention will be more apparent from the following description taken in conjunction with the drawing in which:

FIG. 3 illustrates a group of tables which are utilized in conjunction with the flowchart of FIG. 2; and FIG. 4 shows an illustrative display of information presented to the user in accordance with the present invention.

GENERAL DESCRIPTION

Figure 1:
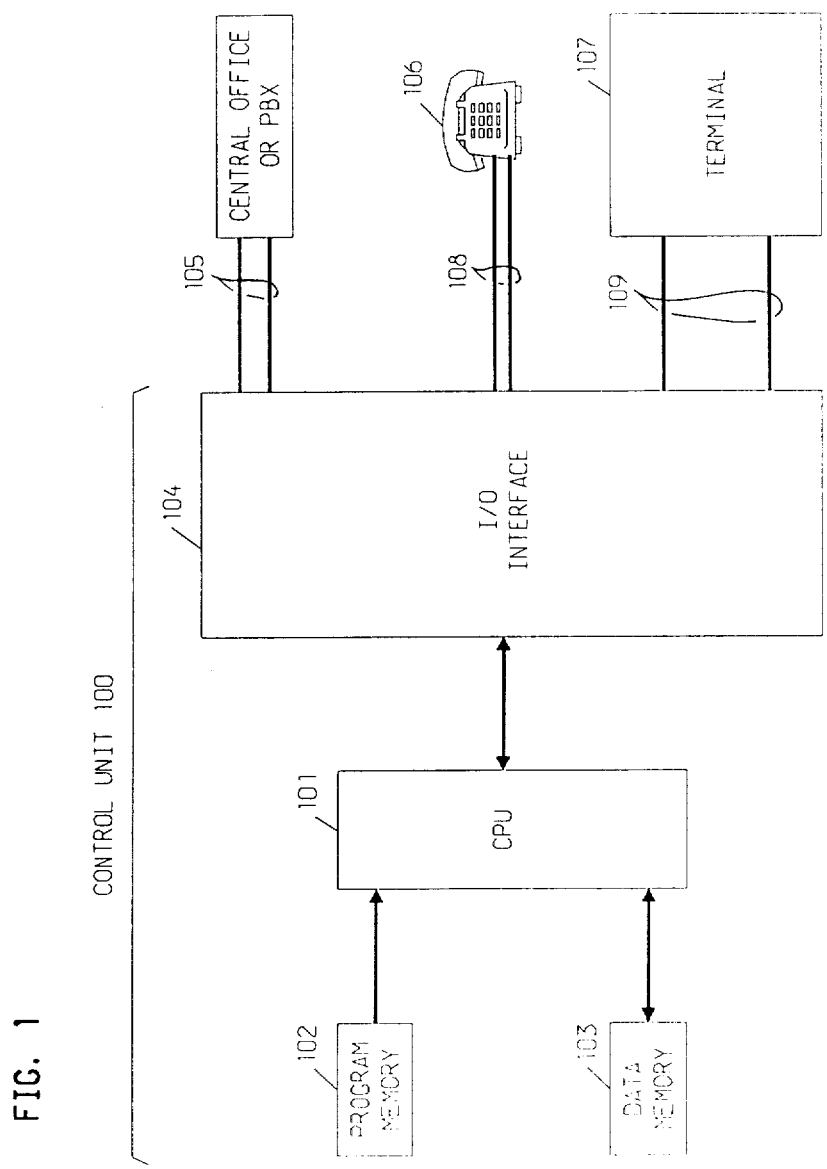
FIG. 1 is a block diagram of a communication system useful in describing the present invention.

Shown in FIG. 1 is an illustrative block diagram of a communication system useful for describing the operation of the present invention. The system includes common control unit 100 which connects to one or more central office (CO) or PBX lines, such as 105, and which connects to one or more station sets (e.g., 106) or terminals (e.g., 107), via facilities 108 and 109, respectively. Control unit 100 establishes and controls all intercom and CO or PBX line communications. Program memory 102 provides instructions to central processor unit (CPU) 101 for controlling the various operating features and functions of the system. Data memory 103 is utilized by the CPU for storing and accessing data associated with performing the various functions and features programmed in program memory 102. In one embodiment, CPU 101 is a microprocessor, program memory 102 is read-only-memory (ROM) and data memory 103 is random-access-memory (RAM). The interface circuit 104 contains well-known switching, network control, and line circuits required by the system to establish, maintain and terminate communication connections between a station set or terminal and the CO or PBX lines.

Terminal 107 as utilized with the present invention may be a computer, or a workstation having an interactive display capability, and an associated telephone or internal dialing capability. Terminal 107 may also enable any of the calling features available at other telephone station sets of the system. While terminal 107 is illustrated as connected through a communication system to CO lines, it could also be directly connected to CO lines.

Figure 2:
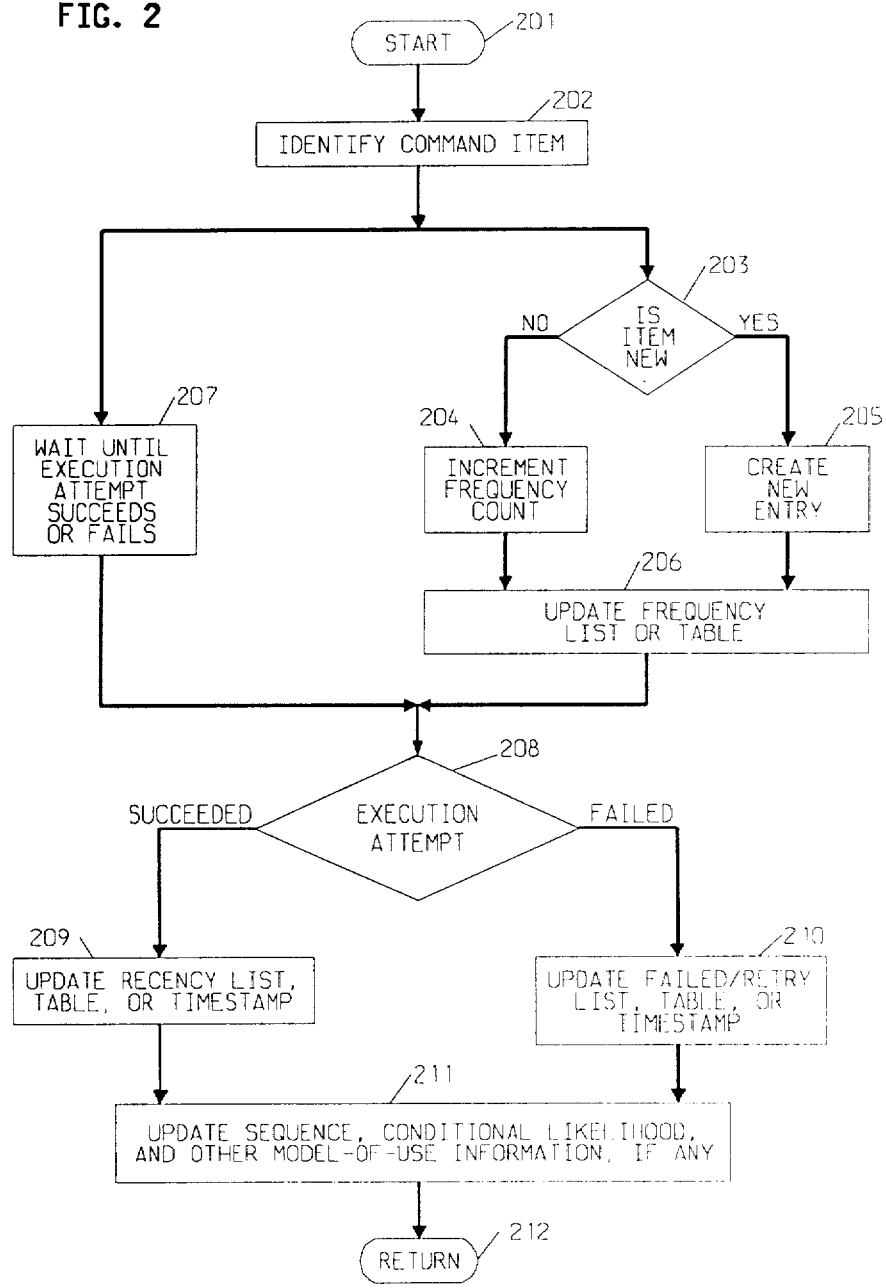
FIG. 2 shows a flowchart useful in describing the present invention.

In accordance with the present invention, a program as illustrated by the flowchart of FIG. 2 enables a user at terminal 107 one-touch access to telephone calling information hereinafter referred to as command items (such as telephone numbers, names or telephone dialing commands) which are most likely to be needed, without requiring the user to either explicitly program a command repertoire or to search through a list of command items. The flowchart of FIG. 2 and the table of FIG. 3 associated therewith may be partially or totally implemented in either control unit 100 or terminal 107.

While the present embodiment of the present invention is described as being utilized with or incorporated in a telephone communication system, it should be recognized that the present command-operated system could be utilized in a computer or other program-controlled systems. Since such systems utilize a variety of hardware and programming techniques, no attempt is made to describe the details of the program used to control the system. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the flowchart of FIG. 2 together with the table of FIG. 3 which together describe the logical steps and the various parameters required to implement the present invention.

DETAILED DESCRIPTION

With reference to FIGS. 2 and 3, the present invention is implemented in two parts: command implementation and command selection. The first part (201–212) of the implementation is carried out whenever the user attempts the execution of a command item--for example, by entering a command to a computer software system, or by dialing a telephone number, or by selecting a command item from a displayed menu of such items. The second part (not shown) is carried out whenever there is a need to display, or to update the display of, a menu of selected command items for rapid selection by the user.

A system implementing the present invention also incorporates software, as needed, to identify the command item selected from the menu by the user, and to attempt its execution. In addition, because the first part of the implementation uses information storage capacity, this implementation also incorporates procedures for selecting least relevant information and for purging this information from storage whenever it becomes likely that the amount of information being stored would exceed the storage allocated to the heuristic in the system on which it is implemented.

Procedures for the command selection part of the implementation, which includes two procedures known to computer software programmers as "command selection" and "garbage collection", will not be described in detail below, since they are independent of the new method, and since procedures for carrying them out are already widely known among software developers. Display command selection may utilize a touch sensitive screen whereby the user touches the command which he or she wants to activate. Garbage collection, for example, may be accomplished by simply limiting the size of the tables of FIG. 3 and letting least relevant information fall out the bottom of the tables.

The first part of the implementation is carried out whenever the user attempts the execution of a command item, as shown in the flowchart of FIG. 2. First, the program is started (201) and the command item is identified (202). Identifying a new command may include dialing a number or selecting an existing displayed number. At this point, the flow of control separates into two streams, which may be executed in either order or simultaneously. One stream (step 207) attempts execution of the command item and waits until it is known whether the attempt succeeded or failed.

The other stream (steps 203–206) determines in step 203 whether the command item matches a previous entry in a list or directory of command items (204), or is new (203). If the command item is new, an entry is created for it (step 205) in the stored list or table of command items (302 of table 300 of FIG. 3). Table 300 contains a list of all of the command items--e.g., phone numbers--dialed by the user. As previously noted, the system design decides how large table 300 should be and how the least relevant information should be disposed. If the command item is not new, the cumulative frequency count (301 of FIG. 3) for the command item is incremented in step 204. In either case, the list or table of command item frequency is updated (205).

When both streams complete execution, the system determines in step 208 whether the attempt to execute the command item has succeeded or failed. If it succeeded and the command item is new, it is added to the recency list or table with a timestamp (310 of FIG. 3), or if the command item is old, its timestamp 311 is updated in step 209 to indicate a successful execution. If it failed, the failed-retry list, table 320, or timestamp (321 of FIG. 3) is updated in step 210. That is, the first time a command fails, it is added to table 320 with a timestamp; the next time that command fails, the timestamp is updated in step 210. Note, while separate tables or lists are shown in FIG. 3, the frequency or usage count 301, recency timestamp 311 or failed timestamp 321 could all be located in one table or list.

In addition to the timestamp, the system might store additional information, as needed by more sophisticated versions of the heuristic, in step 211. For example, to enable the detection and automatic presentation of the next command in frequently repeated sequences of commands, the system would update, in this step, information on the conditional probability with which the current command has occurred immediately following the preceding command item. The heuristic then returns control to the system in step 212.

The second part of the implementation depends on whether command item menus are normally displayed or normally hidden, and in the latter case on whether several menus controlled by the implementation are displayed together, or only one menu is displayed at a time. Shown in FIG. 4 is dial 450 and buttons 451 utilized to activate the various system telephone features. Also shown in FIG. 4 is one embodiment of the present invention which displays Frequent (410), Recent (420) and Retry (430) menus. These menus (410, 420 and 430) are a display of tables 300, 310 and 320, respectively. If the command items are normally displayed, this part is carried out whenever any data in the command item directory used by the procedure of FIG. 2 has changed. If the menu or menus of command items (410, 420, 430 and 440) are normally hidden, this part is carried out whenever one or more menus of command items need to be displayed--for example, in response to a request from the user.

The items displayed in any given menu are shown in order, such as top to bottom (401) or left to right (not shown), according to their rating on a stored criterion. Thus, the command items in a specific menu might be displayed, for example, in alphabetical or numerical order; or in order of cumulative frequency, most frequent first, for a "Frequent" command item menu (401); or in order of recency, most recent first, for a "Recent" or "Retry" menu (402). Where the system has access to the appropriate database, the name associated with each telephone number can also be displayed (e.g., 403).

If more than one menu is displayed at the same time, as in FIG. 4, a given command item need not appear on more than one menu. Thus, if an item would otherwise be displayed on more than one menu at the same time, it might be displayed only in the menu having the highest priority in this regard, according to stored ordering, for example (Frequent, Recent, Retry). This is done by displaying the menus in order of priority; displaying all the command items that can be displayed in the given menu before displaying the next menu; and checking each item, in a menu other than the highest priority menu, against items already displayed; finally displaying only those items not already displayed.

The saved menu 440 is for special command items which the user wishes to enter via dial 450. An associated table (not shown) would store these saved command items. The items in the saved menu may or may not be entries in any of the other menus 410, 420 and 430.

The command selection part of the implementation is carried out whenever the system detects that the user has carried out the action conveying the selection of an item from a menu--for example, by touching the items's location on a touchscreen, typing a key sequence corresponding to the item, or moving and clicking a pointer device, such as a "mouse", at the item. The "garbage collection" procedure is performed whenever, in the process of carrying out the first part of the implementation, as described above, the system detects a potential shortage of available storage capacity.

It is contemplated that the frequency of use table 300 may be based on the user past frequency, the past frequency of usage from that terminal, the past frequency of usage for the particular function being performed. This frequency heuristic could also be made dependent on the time of day, day of week, month or other parameters. Moreover, the frequency heuristic can be made to be dependent on the previous userselected command. For example, once the user selects one command for operation by the system, the system would display a frequency table of commands (300) which most frequently followed the previous entered command. Additionally, the system could list all commands which are part of frequently repeated sequences of commands entered by the user.

In yet another embodiment of the present invention, the system may use a previously entered predetermined model of a system user to list the commands most likely to be selected by a user conforming to said model at a particular time. This model would characterize the functions to be performed by the user and would specify the commands which enable the user to carry out these functions.

The present invention with straightforward enhancements of the command item selection heuristics of FIG. 2 could be useful in different applications. For example, the present invention could be made part of a programmer's workstation where it would automatically list commands on the display which are most likely to be next selected by the programmer. Thus, a computer programmer might always invoke either a program editor or a compiler after editing a program and running it through a syntax checker. An extension of the heuristic to automatically recognize frequently repeated sequences of commands would be particularly useful, therefore, in a productivity-enhancing user interface program for a computer operating system. The next instruction in recognized sequences that begin with already executed commands would be displayed in a readily accessible menu. Then, for example, if the system had a mouse-driven user interface, when the user operated the button on the mouse to select a command, the menu of possible next commands would appear on the display. The next command in the chosen sequence could then be selected by moving the mouse to its name or symbol in the menu, and releasing the button. The mouse pointer might also be prepositioned on the next command in the most frequently executed sequence, so that it could be selected by simply clicking the button on and off.

The disclosed command operated system can be utilized with any processor-controlled application, and not just a menu-driven computer program or a telephone auto-dialer. For example, the present invention might be incorporated in a digitally controlled convection, microwave oven or other appliances which require user input of commands or variables. For the microwave oven example, the oven would automatically keep track using the heuristic described in the application, of command items, in this case combinations of temperature settings and cooking times. It would then automatically display the most frequently executed combinations for onetouch selection by the user.

What has been described is merely illustrative of the present invention. Other embodiments known to those skilled in the art could be utilized without departing from the spirit and scope of the present invention. Additionally, other applications to telephone, computer or other user interactive systems other than the disclosed system are contemplated as being within the knowledge of one skilled in the art.

What is claimed is:

1. Telephone dialing apparatus for use with a telephone communication system for enabling a user to select a telephone dialing command for input to and execution by said system, said apparatus comprising
    means for identifying each telephone dialing command of a group of telephone dialing commands inputted into said system,
    means responsive to said identifying means for counting the number of times each telephone dialing command is identified,
    table memory means responsive to any change in the count of said counting means for listing a plurality of frequently identified telephone dialing commands which have the highest accumulated count, and
    selection means operable by said user for selecting one of said plurality of frequently identified telephone dialing commands from said table memory means for input to said system.

2. The apparatus of claim 1 wherein said frequently identified telephone dialing commands in said table memory means are based on the present user's past identified telephone dialing command usage pattern.

3. The apparatus of claim 1 including
    means for determining if said user selected telephone dialing command inputted to said system has been executed by said system, and wherein
    said table memory means includes
    recency list means responsive to said determining means for listing telephone dialing commands which have recently been selected by the user and wherein
    said selection means includes
    means for accessing telephone dialing commands in said recency list means for input to said system.

4. The apparatus of claim 1 wherein said apparatus includes
    means for determining if said user selected telephone dialing command inputted to said system has been executed by said system, and wherein
    said table memory means includes retry list means for listing said user selected telephone dialing command which has failed to be executed by said system.

5. The apparatus of claim 1 wherein said identifying means detects a specially designated telephone dialing command dialed by the user and wherein said table memory means includes saved list means for listing said specially designated telephone dialing command as identified by said identifying means which has been inputted to the system by the user.

6. The apparatus of claim 1 further comprising means for determining a conditional probability that said each inputted telephone dialing command is functionally related to another telephone dialing command and wherein said table memory means lists a functionally related telephone dialing command based on the conditional probability that said functionally related telephone dialing command follows a previously executed telephone dialing command, the conditional probability being determined from the user's prior inputted telephone dialing commands or from a previously entered predetermined list of telephone dialing commands.

7. The apparatus of claim 1 including means for accepting and utilizing a predetermined model of said system user's telephone dialing command usage pattern to initially list one or more telephone dialing commands in said table memory means.

8. A method of inputting telephone dialing commands to a telephone communication system comprising the steps of:

identifying each telephone dialing command of a group of telephone dialing commands inputted into said system, counting the number of times each telephone dialing command is identified, listing in a table memory, in response to any change in the count determined in said counting step, frequently identified telephone dialing commands which have the highest accumulated count, and user selection of one of said identified telephone dialing commands from said table memory for input to system.

9. The method of claim 8 wherein the method includes the steps of:

determining if said user selected telephone dialing command has been executed by said system and listing a telephone dialing command, which has previously been selected by a user but which has failed to be executed by said system, in a retry list means for future selection by said user.

* * * * *